US010203990B2

(12) United States Patent
Wagner et al.

(10) Patent No.: US 10,203,990 B2
(45) Date of Patent: Feb. 12, 2019

(54) ON-DEMAND NETWORK CODE EXECUTION WITH CROSS-ACCOUNT ALIASES

(71) Applicant: Amazon Technologies, Inc., Seattle, WA (US)

(72) Inventors: Timothy Allen Wagner, Seattle, WA (US); Marc John Brooker, Seattle, WA (US); Ajay Nair, Seattle, WA (US); Derek Steven Manwaring, Lynwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 15/199,613

(22) Filed: Jun. 30, 2016

(65) Prior Publication Data
US 2018/0004553 A1    Jan. 4, 2018

(51) Int. Cl.
    *G06F 9/50* (2006.01)
    *G06F 9/48* (2006.01)
(52) U.S. Cl.
    CPC .......... *G06F 9/5077* (2013.01); *G06F 9/485* (2013.01); *G06F 9/5072* (2013.01); *G06F 2209/5011* (2013.01)
(58) Field of Classification Search
    CPC .................................. G06F 9/45516
    See application file for complete search history.

(56) References Cited

U.S. PATENT DOCUMENTS 4,949,254 A    8/1990  Shorter 5,283,888 A    2/1994  Dao et al.
(Continued)

FOREIGN PATENT DOCUMENTS

EP    2663052 A1    11/2013
JP    2002287974 A    10/2002
(Continued)

OTHER PUBLICATIONS

AC 2012-4107: Using Amazon EC2 in Computer and Network Security Lab Exercises: Design, Results, and Analysis, 2012, American Society for Engineering Education (Year: 2012).*
(Continued)

*Primary Examiner* — Charlie Sun
(74) *Attorney, Agent, or Firm* — Knobbe, Martens, Olson & Bear, LLP

(57) ABSTRACT

Systems and methods are described for utilizing cross-account access to tasks on an on-demand code execution environment or other distributed code execution environment to implement an application programming interface (API) on a network-accessible service. An on-demand code execution environment can utilize pre-initialized virtual machine instances to enable execution of user-specified code in a rapid manner, without delays typically caused by initialization of the virtual machine instances. While users may generally execute their own code, the present application enables code of a first user to be executed by a second user, while maintaining the privacy and security of the code and associated accounts. Further, the present application enables a set of tasks to be grouped together as an API, enabling any user to create an API for a service, while the on-demand code execution environment manages execution of the tasks and allocation of underlying computing resources.

21 Claims, 6 Drawing Sheets

(56) References Cited

U.S. PATENT DOCUMENTS

| | | |
|---|---|---|
| 5,970,488 A | 10/1999 | Crowe et al. |
| 6,385,636 B1 | 5/2002 | Suzuki |
| 6,463,509 B1 | 10/2002 | Teoman et al. |
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,429,282 B1 | 4/2013 | Ahuja |
| 8,448,165 B1 | 5/2013 | Conover |
| 8,555,281 B1 | 10/2013 | Van Dijk et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,964 B1 | 9/2014 | Sopka et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,930,103 B2 | 3/2018 | Thompson |
| 9,952,896 B2 | 4/2018 | Wagner et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0098154 A1 | 5/2004 | Mccarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0147893 A1 | 6/2008 | Marripudi et al. |
| 2008/0189468 A1 | 8/2008 | Schmidt et al. |
| 2008/0201711 A1 | 8/2008 | Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |

(56) References Cited

U.S. PATENT DOCUMENTS

| | | |
|---|---|---|
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1* | 7/2011 | Mayo ................. G06F 9/5077 709/224 |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0199218 A1 | 7/2015 | Wilson et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0026486 A1 | 1/2016 | Abdallah |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0140180 A1 | 5/2016 | Park et al. |
| 2016/0191420 A1 | 6/2016 | Nagarajan et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |

(56) References Cited

U.S. PATENT DOCUMENTS

| | | |
|---|---|---|
| 2016/0364265 A1 | 12/2016 | Cao et al. |
| 2016/0371127 A1 | 12/2016 | Antony et al. |
| 2016/0378554 A1* | 12/2016 | Gummaraju .......... G06F 9/5011 718/104 |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371724 A1 | 12/2017 | Wagner et al. |
| 2018/0004572 A1 | 1/2018 | Wagner et al. |
| 2018/0039506 A1 | 2/2018 | Wagner et al. |
| 2018/0121245 A1 | 5/2018 | Wagner et al. |
| 2018/0143865 A1 | 5/2018 | Wagner et al. |
| 2018/0157568 A1 | 6/2018 | Wagner |

FOREIGN PATENT DOCUMENTS

| | | |
|---|---|---|
| JP | 2006-107599 A | 4/2006 |
| JP | 2011257847 A | 12/2011 |
| WO | WO 2008/114454 A1 | 9/2008 |
| WO | WO 2009/137567 A1 | 11/2009 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Shim (computing), Wikipedia, https://en.wikipedia.org/w/index.php?title+Shim_(computing)&oldid+654971528, [retrieved on May 26, 2016], 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Search Report and Written Opinion in PCT/US2015/052838 dated Dec. 18, 2015.

International Search Report and Written Opinion in PCT/US2015/052833 dated Jan. 13, 2016.

International Search Report and Written Opinion in PCT/US2015/064071dated Mar. 16, 2016.

International Search Report and Written Opinion in PCT/US2016/016211 dated Apr. 13, 2016.

International Search Report and Written Opinion in PCT/US2016/026514 dated Jun. 8, 2016.

International Search Report and Written Opinion in PCT/US2016/026520 dated Jul. 5, 2016.

International Search Report and Written Opinion in PCT/US2016/054774 dated Dec. 16, 2016.

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

Amazon, "AWS Lambda: Developer Guide", Retrieved from the Internet, Jun. 26, 2016, URL: http://docs.aws.amazon.com/lambda/latest/dg/lambda-dg.pdf.

Balazinska et al., Moirae: History-Enhanced Monitoring, Published: 2007, 12 pages.

Ben-Yehuda et al., "Deconstructing Amazon EC2 Spot Instance Pricing", ACM Transactions on Economics and Computation 1.3, 2013, 15 pages.

Das et al., Adaptive Stream Processing using Dynamic Batch Sizing, 2014, 13 pages.

Hoffman, Auto scaling your website with Amazon Web Services (AWS)—Part 2, Cardinalpath, Sep. 2015, 15 pages.

Kamga et al., Extended scheduler for efficient frequency scaling in virtualized systems, Jul. 2012, 8 pages.

Kazempour et al., AASH: an asymmetry-aware scheduler for hypervisors, Jul. 2010, 12 pages.

Kraft et al., 10 performance prediction in consolidated virtualized environments, Mar. 2011, 12 pages.

Monteil, Coupling profile and historical methods to predict execution time of parallel applications. Parallel and Cloud Computing, 2013, <hal-01228236, pp. 81-89.

International Preliminary Report on Patentability in PCT/US2015/052810 dated Apr. 4, 2017.

International Preliminary Report on Patentability in PCT/US2015/052838 dated Apr. 4, 2017.

International Preliminary Report on Patentability in PCT/US2015/052833 dated Apr. 4, 2017.

International Preliminary Report on Patentability in PCT/US2015/064071 dated Jun. 6, 2017.

International Preliminary Report on Patentability in PCT/US2016/016211 dated Aug. 17, 2017.

International Preliminary Report on Patentability in PCT/US2016/026514 dated Oct. 10, 2017.

International Preliminary Report on Patentability in PCT/US2016/026520 dated Oct. 10, 2017.

International Preliminary Report on Patentability in PCT/US2016/054774 dated Apr. 3, 2018.

International Search Report and Written Opinion in PCT/US2016/066997 dated Mar. 20, 2017.

International Search Report and Written Opinion in PCT/US/2017/023564 dated Jun. 6, 2017.

International Search Report and Written Opinion in PCT/US2017/040054 dated Sep. 21, 2017.

International Search Report and Written Opinion in PCT/US2017/039514 dated Oct. 10, 2017.

\* cited by examiner

ON-DEMAND NETWORK CODE EXECUTION WITH CROSS-ACCOUNT ALIASES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
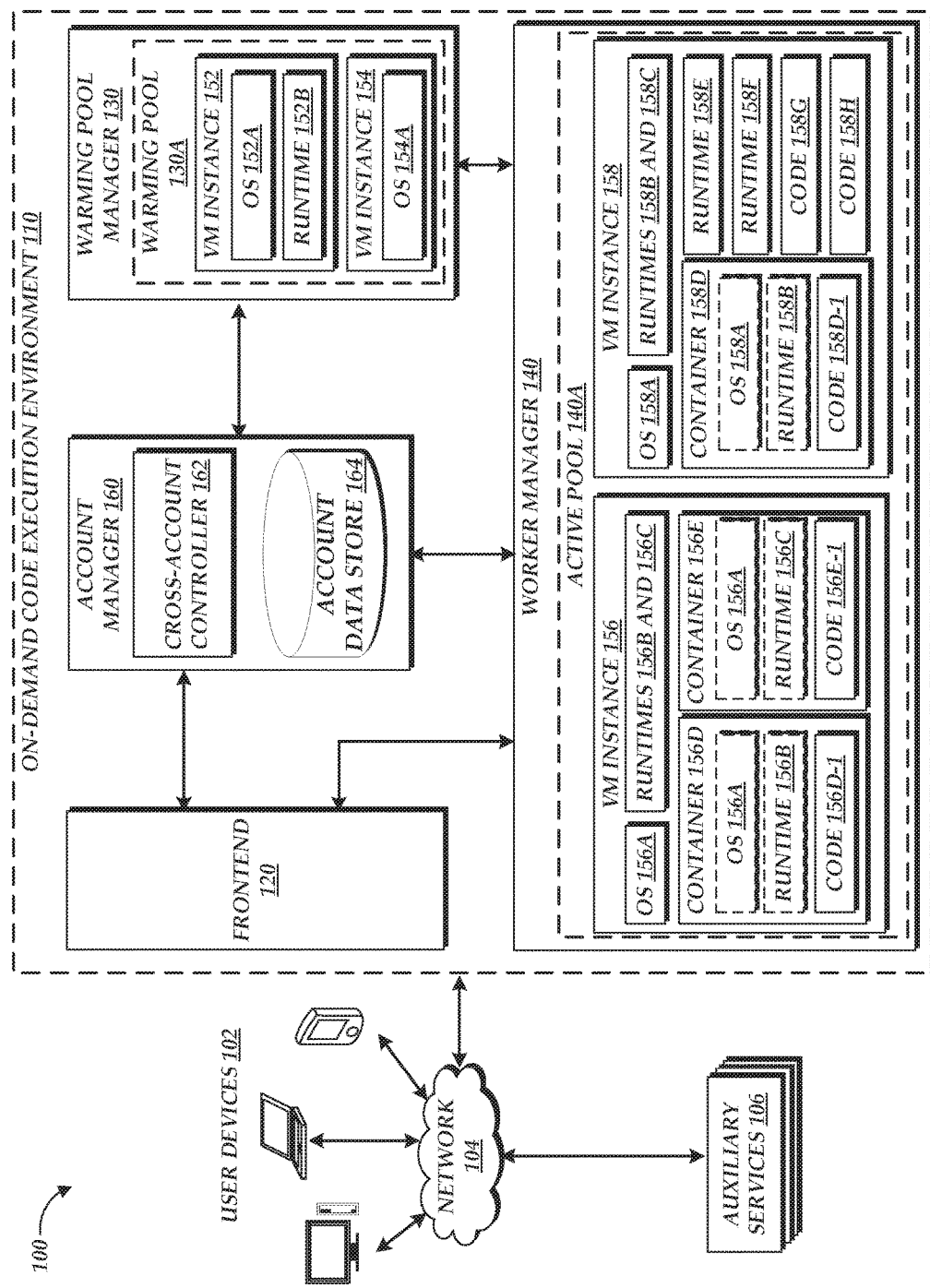
FIG. 1 is a block diagram depicting an illustrative environment in which an on-demand code execution environment can operate, the on-demand code execution environment including an account manager to enable a task created, owned or maintained by a first account to be executed on behalf of a second account.

Generally described, aspects of the present disclosure relate to managing execution of code on an on-demand code execution environment, and more specifically, to enabling multiple entities to execute code created or maintained by a single entity, while ensuring the security of that execution with respect to each entity. Further, aspects of the present disclosure relate to distributing code executions across virtual machines, based on the entities associated with the code execution, to increase the efficiency at which large volumes of code can be executed while maintaining the security of execution with respect to those entities. As described in detail herein, an on-demand code execution environment may provide a network-accessible service enabling users to submit or designate computer-executable code to be executed by virtual machine instances on the on-demand code execution environment. Each set of code on the on-demand code execution environment may define a "task," and implement specific functionality corresponding to that task when executed on a virtual machine instance of the on-demand code execution environment. Individual implementations of the task on the on-demand code execution environment may be referred to as an "execution" of the task. The on-demand code execution environment can further enable users to trigger execution of a task based on a variety of potential events, such as transmission of an application programming interface ("API") call or a specially formatted hypertext transport protocol ("HTTP") packet. Thus, users may utilize the on-demand code execution environment to execute any specified executable code "on-demand," without requiring configuration or maintenance of the underlying hardware or infrastructure on which the code is executed. Further, the on-demand code execution environment may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution environment can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Generally, the on-demand code execution environment may maintain a separation between the tasks of each user, to ensure the privacy and security of the code for those tasks (which may include sensitive information, such as passwords, encryption keys, access codes, API keys, etc.). Further, the on-demand code execution environment may maintain a separation between executions of those tasks. For example, executions of tasks may be grouped within virtual machines according to an underlying "owner" of the task (e.g., an account with full access to the task, often an account that created the task initially) to ensure the security of that execution (given the inherently limited ability of code executed on a virtual machine to access data on or effect the processing of other virtual machines). However, in some instances, it may be desirable to allow a task "owned" by a first account to be called for execution by a second account. This may enable, for example, owners of a task to share access to the task with other users. Therefore, and in accordance with embodiments of the present disclosure, the on-demand code execution environment disclosed herein is configured to allow cross-account access to a task (e.g., access by a first account to a task owned by a second account), while maintaining security of the code underlying the task and between executions of the task. Because execution of a task is associated with resource usage on the on-demand code execution environment (and therefore may be associated with costs), the on-demand code execution environment disclosed herein can further monitor and track executions of tasks with respect to various accounts, to enable accounting of the resource use associated with each account. Moreover, because tasks, when executed, may require access to account-specific resources or parameters (e.g., data that is private to individual accounts), the on-demand code execution environment can function to customize calls to a task according to the desired execution context (e.g., the account to which execution of the task should be associated), and to modify permissions associated with execution of the task in order to enable access to required resources (while prevented access to unauthorized resources). Still further, the on-demand code execution environment may function to distribute sets of executions of a task on virtual machines according to the required permissions of each execution, in order to group those executions in a manner that reduces the overall computing resources needed by the executions.

To enable cross-account access to a task, the on-demand code execution environment can be configured to generate task "aliases." These aliases can be associated with a first account or user, and function as "shortcuts" or "pointers" to tasks of other users. For example, where a first user associated with a first account creates a task, "Task," a second user associated with a second account may create an alias to that task, and name the alias "Task_Alias." Thereafter, the second user may trigger execution of the alias "Task_Alias," thereby causing the code associated with "Task" to be executed. However, because the second account of the second user is associated with an alias to the task, "Task," the on-demand code execution environment can ensure that the second user is not provided access to the code underlying that task. Thus, users may be enabled to "share" tasks across accounts without compromising the privacy and security of those tasks. Moreover, by the use of aliases, the on-demand code execution environment can ensure that each execution of a task is associated with the correct "context" (which may indicate, e.g., the account or user that is associated with triggering execution of the task). For example, when the second user triggers execution of "Task_Alias," the on-demand code execution environment can ensure that the execution of the underlying task "Task," is attributed to the second user. As will be described below, the on-demand code execution environment can therefore utilize virtual machine instances associated with the second user to execute the task, associate the second user with the computing resources (and potentially costs) used to executed the task, or apply rules or other logic associated with the second user to handle execution of the task (e.g., by enqueing or delaying execution of the task according to the requirements of the second user, etc.). In some instances, the on-demand code execution environment may further apply "customizations" to execution of the task according to the requirements of the second user. For example, the on-demand code execution environment may modify the parameters passed to code corresponding to the task, modify permissions under which the task is executed, or modify resources available to the task during execution.

In some instances, a user of the on-demand code execution environment may utilize shared tasks to enable limited access to that users resources (e.g., including data or tasks on the on-demand code execution environment and/or data, services, or resources outside of the on-demand code execution environment). For example, a user may choose to share a task that provides a specific set of functionality, and inform other users of the various parameters of that task that might be customized (e.g., via creation of an alias and associated customizations). In some instances, execution of the shared task (e.g., via an alias) may itself trigger execution of other tasks, which may or may not be shared on the on-demand code execution environment, and which may provide restricted access to the initial user's resources (the resources of the task owner). By sharing a variety of such tasks, a user on the on-demand code execution environment may create their own API, by which that user's resources can be accessed in a controlled manner by other users of the on-demand code execution environment. Thus, the on-demand code execution environment may enable users to generate APIs for any network based service quickly and easily, by submitting code for the various API functions to the on-demand code execution environment, and sharing those API functions with other users. Because the on-demand code execution environment can be configured to track the resources used for each task, and associate it with specific users, the creator of the API may not be required to track user of the API, bill for such use, or manage any computing resources needed by the API. Thus, the on-demand code execution environment can greatly reduce the costs and complexity of creating network-based APIs.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 Patent"), the entirety of which is hereby incorporated by reference.

As will be appreciated by one skilled in the art, the embodiments described herein function to improve the functioning of computing devices by enabling those devices to rapidly execute code of many users within an on-demand code execution environment. Moreover, in the context of an on-demand code execution environment, the present disclosure enables the efficient allocation of code executions to execution environments (e.g., virtual machine instances, containers, etc.), while maintaining the privacy or security of the code. Still further, the present disclosure enables users to quickly alter the parameters, resources, or permissions associated with code execution, thus provided increased flexibility and functionality over prior systems. In some instances, embodiments of the present disclosure may provide a mechanism by which customized APIs may be created and provided, enabling programmatic control of network-based computing resources without requiring users to deploy, manage, or administer the computing resources that provide the customized APIs. Thus, one skilled in the art will appreciate by virtue of the present disclosure that the embodiments described herein represent a substantial contribution to the technical field of virtual machine usage management, network-based code execution, and to computing devices in general.

The foregoing aspects and many of the attendant advantages of this disclosure will become more readily appreciated as the same become better understood by reference to the following detailed description, when taken in conjunction with the accompanying drawings.

FIG. 1 is a block diagram of an illustrative operating environment 100 in which an on-demand code execution environment 110 may operate based on communication with user computing devices 102 and auxiliary services 106. By way of illustration, various example user computing devices 102 are shown in communication with the on-demand code execution environment 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution environment 110 may provide the user computing devices 102 with one or more user interfaces, command-line interfaces (CLI), application programming interfaces (API), and/or other programmatic interfaces for generating and uploading user-executable code, invoking the user-provided code (e.g., submitting a request to execute the user codes on the on-demand code execution environment 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution environment 110, or with third parties), data bases, really simple syndication ("RSS") readers, social networking sites, or any other source of network-accessible service or data source. In some instances, auxiliary services 106 may be associated with the on-demand code execution environment 110, e.g., to provide billing or logging services to the on-demand code execution environment 110. In some instances, auxiliary services 106 actively transmit information, such as API calls or other task-triggering information, to the on-demand code execution environment 110. In other instances, auxiliary services 106 may be passive, such that data is made available for access by the on-demand code execution environment 110. As described below, components of the on-demand code execution environment 110 may periodically poll such passive data sources, and trigger execution of tasks within the on-demand code execution environment 110 based on the data provided. While depicted in FIG. 1 as distinct from the user computing devices 102 and the on-demand code execution environment 110, in some embodiments, various auxiliary services 106 may be implemented by either the user computing devices 102 or the on-demand code execution environment 110.

The user computing devices 102 and auxiliary services 106 may communication with the on-demand code execution environment 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks (not shown in FIG. 1). The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer to peer network configurations to implement at least a portion of the processes described herein.

Further, the on-demand code execution environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution environment 110 is illustrated as connected to the network 104. In some embodiments, any of the components within the on-demand code execution environment 110 can communicate with other components of the on-demand code execution environment 110 via the network 104. In other embodiments, not all components of the on-demand code execution environment 110 are capable of communicating with other components of the virtual environment 100. In one example, only the frontend 120 may be connected to the network 104, and other components of the on-demand code execution environment 110 may communicate with other components of the virtual environment 100 via the frontend 120.

In FIG. 1, users, by way of user computing devices 102, may interact with the on-demand code execution environment 110 to provide executable code, and establish rules or logic defining when and how such code should be executed on the on-demand code execution environment 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution environment 110, and request that the on-demand code execution environment 110 execute the code using one or more pre-established virtual machine instances. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution environment 110, the environment 110 includes a frontend 120, which enables interaction with the on-demand code execution environment 110. In an illustrative embodiment, the frontend 120 serves as a "front door" to the other services provided by the on-demand code execution environment 110, enabling users (via user computing devices 102) to provide, request execution of, and view results of computer executable code. The frontend 120 includes a variety of components (not shown in FIG. 1) to enable interaction between the on-demand code execution environment 110 and other computing devices. For example, the frontend 120 can includes a request interface providing user computing devices 102 with the ability to upload or otherwise communication user-specified code to the on-demand code execution environment 110 and to thereafter request execution of that code. In one embodiment, the request interfaces communicates with external computing devices (e.g., user computing devices 102, auxiliary services 106, etc.) via a graphical user interface (GUI), CLI, or API. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution environment 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution environment 110) prior to the request being received by the on-demand code execution environment 110. The on-demand code execution environment 110 may vary its execution strategy for a task based on where the code of the task is available at the time a call for the task is processed.

A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution environment 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution environment 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution environment 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution environment 110 may inspect the call and look for the flag or the header, and if it is present, the on-demand code execution environment 110 may modify the behavior (e.g., logging facilities) of the container in which the task is executed, and cause the output data to be provided back to the user. In some embodiments, the behavior/mode indicators are added to the call by the user interface provided to the user by the on-demand code execution environment 110. Other features such as source code profiling, remote debugging, etc. may also be enabled or disabled based on the indication provided in a call.

To manage requests for code execution, the frontend 120 can further include an execution queue (not shown in FIG. 1), which can maintain a record of user-requested task executions. Illustratively, the number of simultaneous task executions by the on-demand code execution environment 110 is limited, and as such, new task executions initiated at the on-demand code execution environment 110 (e.g., via an API call) may be placed on the execution queue and processed, e.g., in a first-in-first-out order. In some embodiments, the on-demand code execution environment 110 may include multiple execution queues, such as individual execution queues for each user account. For example, users of the on-demand code execution environment 110 may desire to limit the rate of task executions on the on-demand code execution environment 110 (e.g., for cost reasons). Thus, the on-demand code execution environment 110 may utilize an account-specific execution queue to throttle the rate of simultaneous task executions by a specific user account. In some instances, the on-demand code execution environment 110 may prioritize task executions, such that task executions of specific accounts or of specified priorities bypass or are prioritized within the execution queue. The number and configuration of execution queues may in some instances be modified based on pre-trigger notifications received at the on-demand code execution environment 110 (e.g., based on a predicted number of subsequent task calls to be received based on the pre-trigger notifications). In other instances, the on-demand code execution environment 110 may execute tasks immediately or substantially immediately after receiving a call for that task, and thus, the execution queue may be omitted.

As noted above, tasks may be triggered for execution at the on-demand code execution environment 110 based on explicit calls from user computing devices 102 (e.g., as received at the request interface 120). Alternatively or additionally, tasks may be triggered for execution at the on-demand code execution environment 110 based on data retrieved from one or more auxiliary services 106. To facilitate interaction with auxiliary services 106, the frontend 120 can include a polling interface (not shown in FIG. 1), which operates to poll auxiliary services 106 for data. Illustratively, the polling interface may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution environment 110. Illustratively, criteria for execution of a task may include, but is not limited to, whether new data is available at the auxiliary services 106, the type or content of the data, or timing information corresponding to the data. In addition to tasks executed based on explicit user calls and data from auxiliary services 106, the on-demand code execution environment 110 may in some instances operate to trigger execution of tasks independently. For example, the on-demand code execution environment 110 may operate (based on instructions from a user) to trigger execution of a task at each of a number of specified time intervals (e.g., every 10 minutes).

The frontend 120 can further includes an output interface (not shown in FIG. 1) configured to output information regarding the execution of tasks on the on-demand code execution environment 110. Illustratively, the output interface may transmit data regarding task executions (e.g., results of a task, errors related to the task execution, or details of the task execution, such as total time required to complete the execution, total data processed via the execution, etc.) or pre-trigger notifications (received pre-trigger notifications, actions taken based on pre-trigger notification, determined correlations between pre-trigger notifications and subsequent task executions, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

While not shown in FIG. 1, in some embodiments, the on-demand code execution environment 110 may include multiple frontends 120. In such embodiments, a load balancer may be provided to distribute the incoming calls to the multiple frontends 120, for example, in a round-robin fashion. In some embodiments, the manner in which the load balancer distributes incoming calls to the multiple frontends 120 may be based on the state of the warming pool 130A and/or the active pool 140A. For example, if the capacity in the warming pool 130A is deemed to be sufficient, the calls may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the calls may be distributed to the multiple frontends 120 in a manner that reduces or minimizes the number of virtual machine instances taken from the warming pool 130A. For example, even if, according to a load balancing restriction, a call is to be routed to Frontend A, if Frontend A needs to take an instance out of the warming pool 130A to service the call but Frontend B can use one of the instances in its active pool to service the same call, the call may be routed to Frontend B.

To execute tasks, the on-demand code execution environment 110 includes a warming pool manager 130, which "pre-warms" (e.g., initializes) virtual machine instances to enable tasks to be executed quickly, without the delay caused by initialization of the virtual machines. The on-demand code execution environment 110 further includes a worker manager 140, which manages active virtual machine instances (e.g., currently assigned to execute tasks in response to task calls).

The warming pool manager 130 ensures that virtual machine instances are ready to be used by the worker manager 140 when the on-demand code execution environment 110 detects an event triggering execution of a task on the on-demand code execution environment 110. In the example illustrated in FIG. 1, the warming pool manager 130 manages the warming pool 130A, which is a group (sometimes referred to as a pool) of pre-initialized and pre-configured virtual machine instances that may be used to execute tasks in response to triggering of those tasks. In some embodiments, the warming pool manager 130 causes virtual machine instances to be booted up on one or more physical computing machines within the on-demand code execution environment 110 and added to the warming pool 130A. For example, the warming pool manager 130 may cause additional instances to be added to the warming pool 130A based on the available capacity in the warming pool 130A to service incoming calls. As will be described below, the warming pool manager 130 may further work in conjunction with other components of the on-demand code execution environment 110, such as the worker manager 140, to add or otherwise manage instances and/or containers in the warming pool based on received pre-trigger notifications. In some embodiments, the warming pool manager 130 may utilize both physical computing devices within the on-demand code execution environment 110 and one or more virtual machine instance services to acquire and maintain compute capacity that can be used to service calls received by the frontend 120. Further, the on-demand code execution environment 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific call to execute a task. The predetermined set of configurations can correspond to various types of virtual machine instances to execute tasks. The warming pool manager 130 can optimize types and numbers of virtual machine instances in the warming pool 130A based on one or more metrics related to current or previous task executions. Further, the warming pool manager 130 can establish or modify the types and number of virtual machine instances in the warming pool 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's calls. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution environment 110, the user interface may prompt the user to specify one of the predetermined operating conditions for executing the task. In another example, the service-level agreement (SLA) for utilizing the services provided by the on-demand code execution environment 110 may specify a set of conditions (e.g., programming languages, computing resources, etc.) that tasks should satisfy, and the on-demand code execution environment 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pool 130A are usable by which user), among other specified conditions.

The worker manager 140 manages the instances used for servicing incoming calls to execute tasks. In the example illustrated in FIG. 1, the worker manager 140 manages the active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, the worker manager 140 may, based on information specified in a call to execute a task, create a new container or locate an existing container in one of the instances in the active pool 140A and assigns the container to the call to handle the execution of the task. In one embodiment, such containers are implemented as Linux containers.

Once a triggering event to execute a task has been successfully processed by the frontend 120, the worker manager 140 finds capacity to execute a task on the on-demand code execution environment 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution environment 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution environment 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution environment 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution environment 110 may provide data to one or more of the auxiliary services 106 as it executes tasks in response to triggering events. For example, the frontend 120 may communicate with the monitoring/logging/billing services included within the auxiliary services 106. The monitoring/logging/billing services may include: a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the monitoring/logging/billing services (e.g., on behalf of the on-demand code execution environment 110), the monitoring/logging/billing services may provide application-level services on behalf of the tasks executed on the on-demand code execution environment 110. For example, the monitoring/logging/billing services may monitor and/or log various inputs, outputs, or other data and parameters on behalf of the tasks being executed on the on-demand code execution environment 110. As will be described in more detail below, the frontend 120 may additionally interact with auxiliary services 106 to receive pre-trigger notifications indicating a potential for subsequent calls to execute tasks on the on-demand code execution environment 110.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail within the '556 Patent, incorporated by reference above (e.g., within FIG. 2 of the '556 Patent). In some instance, the instance allocation unit's operation may be modified based on expected incoming code execution requests, as predicted based on received pre-trigger notifications. For example, where the on-demand code execution environment 110 utilizes or has access to dynamically provisioned computing resources (such as dynamically provisioned network-based storage space, scalable access to processing power, etc.), the instance allocation unit may be configured to modify an amount of one or more of those dynamically provisioned computing resources. For example, the instance allocation unit may interact with a dynamically allocated network storage service (not shown in FIG. 1) to increase the amount of data storage available to virtual machine instances.

In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the on-demand code execution environment 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the on-demand code execution environment 110 may comprise multiple frontends 120, multiple warming pool managers 130, and/or multiple worker managers 140. Although four virtual machine instances are shown in the example of FIG. 1, the embodiments described herein are not limited as such, and one skilled in the art will appreciate that the on-demand code execution environment 110 may comprise any number of virtual machine instances implemented using any number of physical computing devices. Similarly, although a single warming pool 130A and a single active pool 140A are shown in the example of FIG. 1, the embodiments described herein are not limited as such, and one skilled in the art will appreciate that the on-demand code execution environment 110 may comprise any number of warming pools and active pools.

In accordance with embodiments of the present disclosure, the on-demand code execution environment 110 further includes an account manager 160, which includes components for managing accounts of users on the on-demand code execution environment. For example, the account manager 160 can enable users to create and manage accounts (e.g., by establishing profiles for accounts, which may include details such as payment information, preferences for execution or queuing of tasks, etc.), create tasks owned by the account, submit code corresponding to tasks, view details regarding executions of tasks, specify how tasks are triggered, etc. The details of an account and/or code corresponding to tasks of the account may be stored in the account data store 164. The account data store 164 may correspond to any persistent or substantially persistent data storage, such as a hard drive (HDD), a solid state drive (SDD), network attached storage (NAS), a tape drive, or any combination thereof. While shown as a single data store, the account data store 164 may include multiple underlying logical or physical data stores (e.g., a first data store to hold user account profiles, a second data store to hold code corresponding to tasks, etc.). Further, the account manager 160 can enable a user of a first account to share access to a task of that first account with users of a second account. For example, the account manager 160 can provide a user interface (e.g., GUI, CLI, API, etc.) enabling a user of the first account to specify a task that should be made available to users of other accounts, as well as aspects of that task that should or should not be customizable by the other accounts. For example, the user may specify that a first parameter passed during a call to execute the task by another account may be customized for the other account, while a second parameter may not. Similarly, the user may specify that permissions of the task to access a specific resource may or may not be customized for the other account. Still further, the user may specify conditions under which the task is shared (e.g., that the task is sharable only to specific accounts, accounts of a specific type, accounts with a specific license, etc.). The parameters for sharing of the task (e.g., whether it is shared, what aspects may be customized, who it may be shared with, etc.) can be stored within the account data store 164.

The account manager 160 can further be configured to enable users to request access to a task shared from another account. In some instances, the account manager 160 may provide functionality enabling users to browse, search, and request access to shared tasks of other accounts. In other instances, such functionality may be provided separately from the on-demand code execution environment 110, or by other components of the on-demand code execution environment 110 not shown in FIG. 1. Once a task of another account is located by a user, the user may submit a request to the account manager 160 to access the task. The account manager 160 can include a cross-account controller 162 to facilitate retrieval and processing of such requests. In one embodiment, the cross-account controller 162 can verify that the user has permission to access the task of the other account (e.g., that the parameters for sharing the task have been met), and thereafter, create an alias to the task on an account of the user. Illustratively, the alias can serve as a "placeholder" or "shortcut" to the task, within the account of the user. In this manner, the alias can share some similarities with a task, in that it may be "called" by a user to cause execution of underlying code. However, unlike a task, the user associated with the alias may be unable to access or view the underlying code itself. Instead, the account manager 160 may simply allow the user to specify what underlying task (e.g., on another account of the on-demand code execution environment 110) the alias should reference. Thereafter, a call to the alias can be used to execute the underlying code of the task referenced by the alias.

In some instances, the account manager 160 can further enable a user associate an alias with customizations that effect how the task referenced by the alias is executed by the on-demand code execution environment 110. For example, the account manager 160 can enable a user to specify "overrides" for parameters of a referenced task, such that a call to the alias causes the task to execute with different or additional parameters than would be used for a call directly to the task. As a further example, the account manager 160 can enable a user to specify permissions under which the task should execute when called via an alias, resources that should be made available to the task when executed via the alias, or criteria for selecting a virtual machine instance on which to execute the task. These customizations may be stored within the account data store 164, along with a record of the alias, such that calling the alias (e.g., with appropriate credentials for the account associated with the alias) causes the task to be executed using the customizations.

Figure 2:
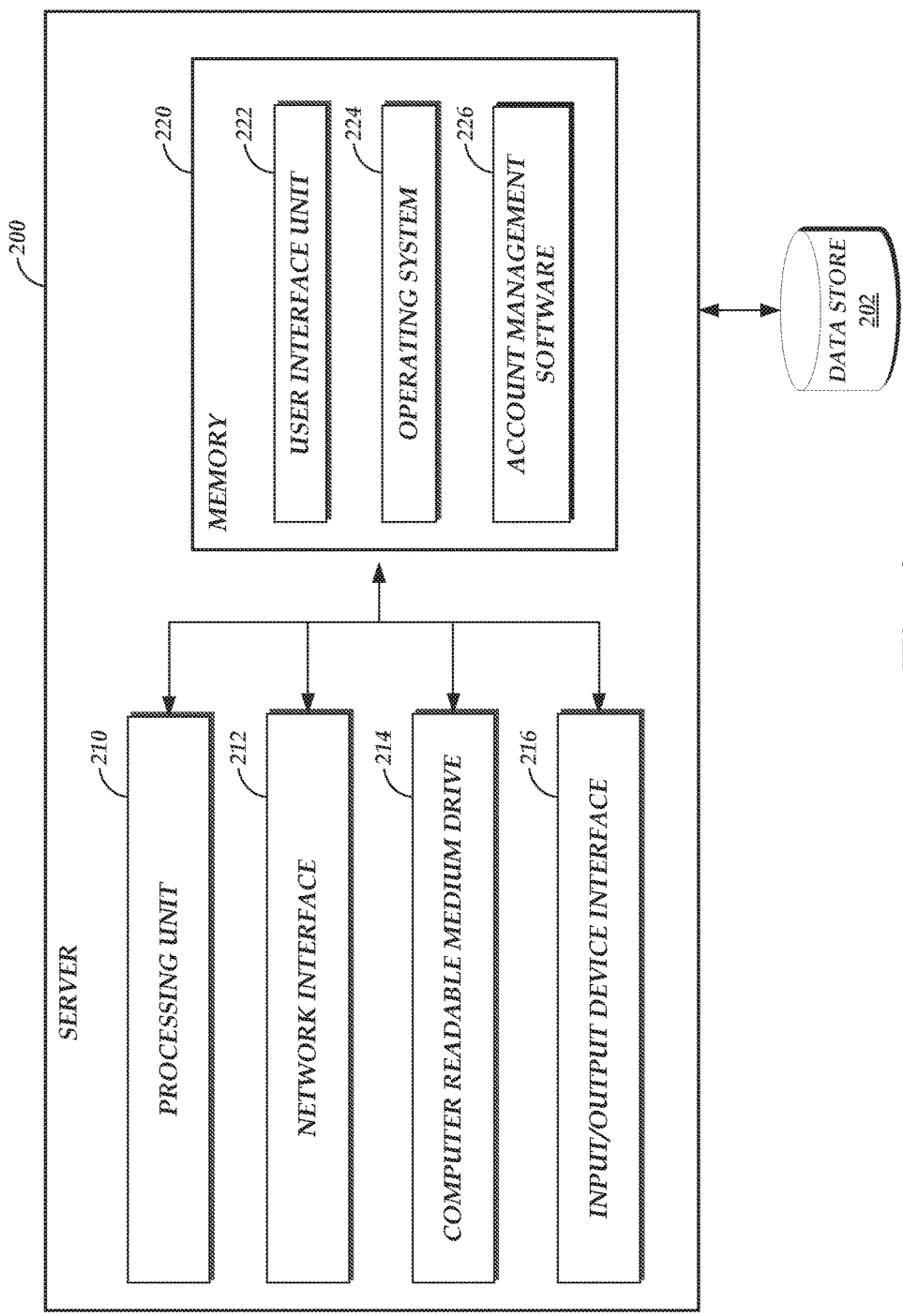
FIG. 2 depicts a general architecture of a computing device providing the account manager of FIG. 1.

FIG. 2 depicts a general architecture of a computing system (referenced as server 200) that implements embodiments of the present disclosure to enable cross-account access to tasks on the on-demand code execution environment 110. The general architecture of the server 200 depicted in FIG. 2 includes an arrangement of computer hardware and software modules that may be used to implement aspects of the present disclosure. The hardware modules may be implemented with physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the server 200 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 220 and further provide output information for an optional display (not shown) via the input/output device interface 216. The input/output device interface 216 may also accept input from an optional input device (not shown).

The memory 220 may contain computer program instructions (grouped as modules in some embodiments) that the processing unit 210 executes in order to implement one or more aspects of the present disclosure. The memory 210 generally includes RAM, ROM and/or other persistent, auxiliary or non-transitory computer readable media. The memory 210 may store an operating system 224 that provides computer program instructions for use by the processing unit 210 in the general administration and operation of the server 200. The memory 220 may further include computer program instructions and other information for implementing aspects of the present disclosure. For example, in one embodiment, the memory 220 includes a user interface unit 222 that generates user interfaces (and/or instructions therefor) for display upon a computing device, e.g., via a navigation and/or browsing interface such as a browser or application installed on the computing device. In addition, the memory 220 may include and/or communicate with one or more data repositories, such as the data store 202, which may correspond to any persistent or substantially persistent data storage, such as a hard drive (HDD), a solid state drive (SDD), network attached storage (NAS), a tape drive, or any combination thereof.

In addition to and/or in combination with the user interface unit 222, the memory 220 may include account management software 226 that corresponds to computer-executable instructions which, when executed by the server 200, implement the functions described above with respect to the account manager 160. While the account management software 226 is shown in FIG. 2 as part of the server 200, in other embodiments, all or a portion of the account manager 160 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the account manager 160.

While the computing device of FIG. 2 is described as implementing the account manager 160, the same or a similar computing device may additionally or alternatively be utilized to implement other components of the on-demand code execution environment 110. For example, such a computing device may be utilized, independently or in conjunction with other components (e.g., data stores) to implement the warming pool manager 130 or worker manager 140 of FIG. 1. The software or computer-executable instructions placed within the memory 180 may be modified to enable execution of the functions described herein with respect to the warming pool manager 130 or worker manager 140.

Figure 3:
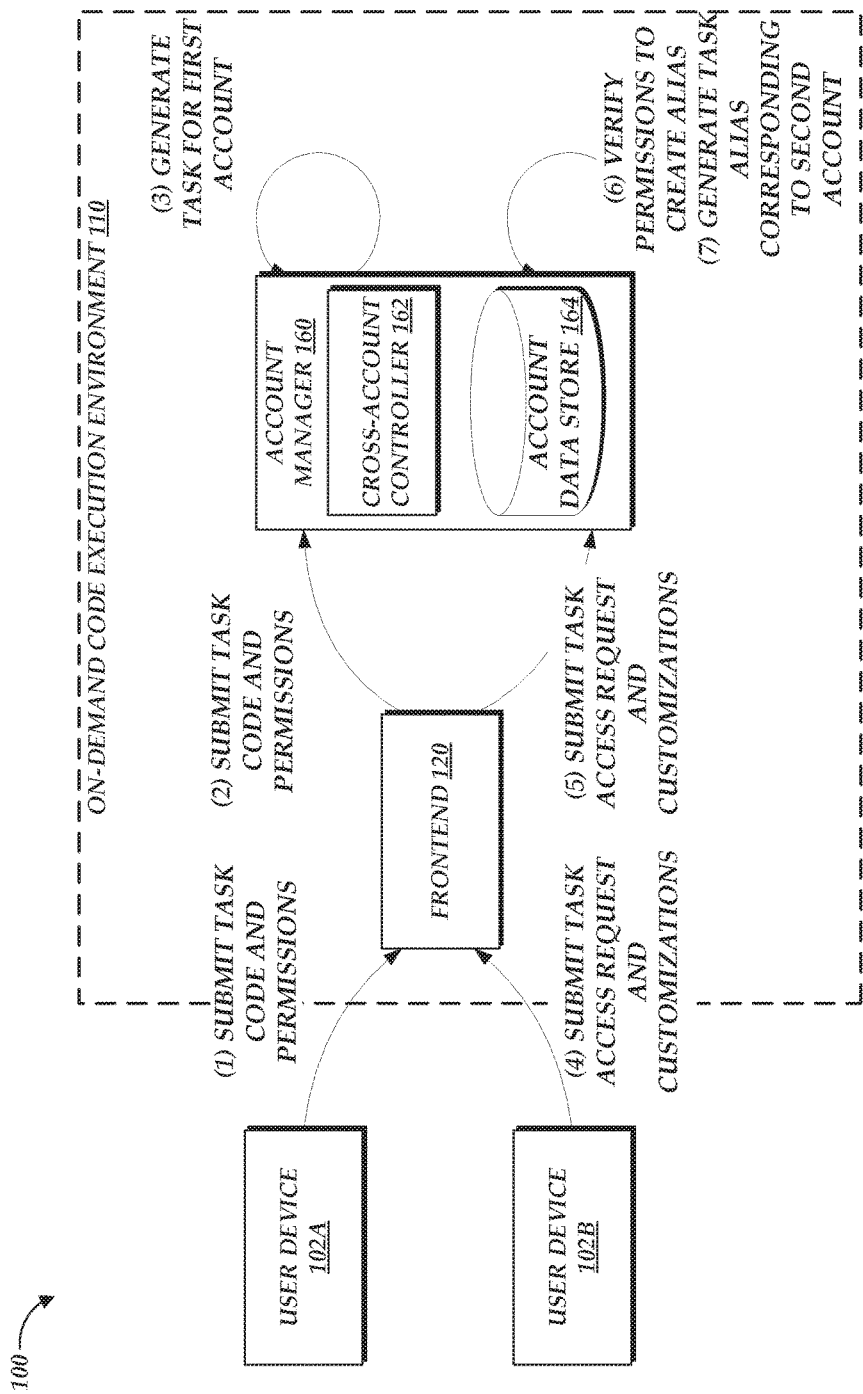
FIG. 3 is a flow diagram depicting illustrative interactions for generating a cross-account association between an account on the on-demand code execution environment of FIG. 1 and a task created by a distinct account.

With reference to FIG. 3, illustrative interactions are depicted for the submission of code to the on-demand code execution environment 110 to create a task associated with a first account, and the creation of an alias for that task to enable cross-account access to the task by a second account. The interactions of FIG. 3 begin at (1), where a user device 102A, associated with a first account on the on-demand code execution environment 110, submits to the frontend 120 information for creation of a task on the on-demand code execution environment 110. Illustratively, the submitted information may include the code that can be executed to achieve the functionality of the task as well as metadata regarding the task or the code, such as a language in which the code is written, parameters to pass to functions of the code, permissions required for the code to execute, a required or preferred execution environment of the code (e.g., dependencies, required operating system, etc.), other data enabling the on-demand code execution environment 110 to execute the code, or desired mechanisms for triggering the task (e.g., HTTP packet, API call, etc.). The information may further include permissions associated with the task, such as whether the task may be shared with other accounts and aspects of task execution that may be modified if the task is called by other accounts (e.g., including any aspect of the metadata discussed above).

At (2), the frontend 120 can pass the information submitted by the user device 102A to the account manager 160. The account manager 160, in turn, may at (3) utilize the information to generate a task for the first account (associated with user device 102A). For example, the account manager 160 may store the code, as well as associated metadata and permissions, within the account data store 164. While not shown in FIG. 3, the account manager 160 and/or frontend 120 may return information regarding the created task to the user device 102A, such as a confirmation that the task has been created, or access information for triggering the task (e.g., a URL to which an HTTP packet triggering the task can be transmitted, credentials to be used when triggering the task, etc.).

Thereafter, at (4), a user device 102B associated with a second account can submit to the frontend 120 a request to access the task created by the user device 102A (and associated with the first account). As shown in FIG. 3, the user device 102B can, in some instance, further submit customizations for the task. These customizations may generally modify or override any metadata associated with the task or the code, including (but not limited to) parameters to pass to functions of the code, permissions required for the code to execute, a required or preferred execution environment of the code, or desired mechanisms for triggering the task. For example, customizations may request that, when the task is executed on behalf of the second user account, additional or different parameters be passed to the underlying code than would be passed if executed on behalf of the first account. As a further example, the customizations may request that, when the task is executed on behalf of the second user account, the underlying code should be provided with different permissions than would be provided if executed on behalf of the first account (e.g., permissions to access resources associated with the second account).

At (5), the frontend 120 can pass the request to access the task, as well as any requested customizations, to the account manager 160. In turn, the account manager 160, at (6), can verify that the user device 102B (associated with the second account) has permissions to create an alias for the task that enables users of the second account to execute the task. For example, the account manager 160 may inspect the permissions associated with the task by the user device 102A, to verify that the second account qualifies for cross-account access of the task. As noted above, such cross-account access may require, for example, that the second account be associated with a specified license, specific account type, or other criteria designated by the user device 102A (e.g., in connection with interaction (1), above). After verifying that the second account is eligible for cross-account access to the task, the account manager 160, at (7), can generate an alias for the task, and associate the alias with the second account. Illustratively, the account manager 160 may create an alias in a manner similar to generating a task associated with the second account. However, rather than directly specifying the underlying code and metadata, the alias may reference the task of the first account. Thus, the alias may serve as a "shortcut" or "reference" to the task on the first account that enables the user device 102B to alter certain metadata regarding the alias, but not to view the underlying code of the task or to alter metadata other than what has been permitted by the user device 102. The second account can therefore be permitted limited access to the task of the first account, while maintaining the privacy and security of the task. While not shown in FIG. 3, the account manager 160 and/or frontend 120 may return information regarding the created alias to the user device 102B, such as a confirmation that the alias has been created, or access information for triggering the task via the alias (e.g., a URL to which an HTTP packet triggering the task can be transmitted, credentials to be used when triggering the task via the alias, etc.).

One of skill in the art will appreciate that the interactions of FIG. 3 may include additional or alternative interactions to those described above. For example, in some instances an owner (e.g., a user of a first account) of a set of tasks may designate those tasks as interrelated, and specify permissions for the set of tasks as a collection. Illustratively, a user may designate a collection of tasks as forming an API to a service of the user (e.g., as provided by other tasks executing on the on-demand code execution environment 110, by auxiliary services 106, etc.). Where the on-demand code execution environment 110 provides functionality enabling users to browse and search for tasks of different accounts, the on-demand code execution environment 110 may further makes such collections of tasks available during browsing and searching. Moreover, in addition to submitting requests to access individual tasks of other accounts, the on-demand code execution environment 110 may be configured to receive and process requests to access collections of tasks. By utilizing collections of tasks, users may, for example, create "cloud-based APIs" on the on-demand code execution environment 110, whereby users may submit functions within an API as tasks on the on-demand code execution environment 110, and enable other users to execution those tasks. A user may therefore create and enable an API without being required to control the underlying hardware that processes the functions, to monitor computing resources used, to control billing for use of such resources, etc. In some instances, the user may specify permissions for an API such that a specific license is required to call tasks within the API from other accounts, thereby enabling the user to maintain control of the API even when execution of the functions within the API is achieved on the on-demand code execution environment 110.

In some instances, the interactions of FIG. 3 may further enable updates or modifications to tasks (or collections of tasks). For example, while interactions (1) through (3) are described with reference to a newly submitted task, these interactions may also be used to submit modifications to a present task (e.g., to modify the underlying code for a task). In such instances, the account manager 160 may, rather than generating a new task, modify the attributes of an existing task (e.g., by modifying the code for the task, the permissions, etc.). In some instances, the account manager 160 may also verify or modify aliases associated with a modified task (e.g., to verify that those aliases comply with updated permissions, that the customizations applied via the alias are compliant with the updated code or permissions, etc.).

Figure 4:
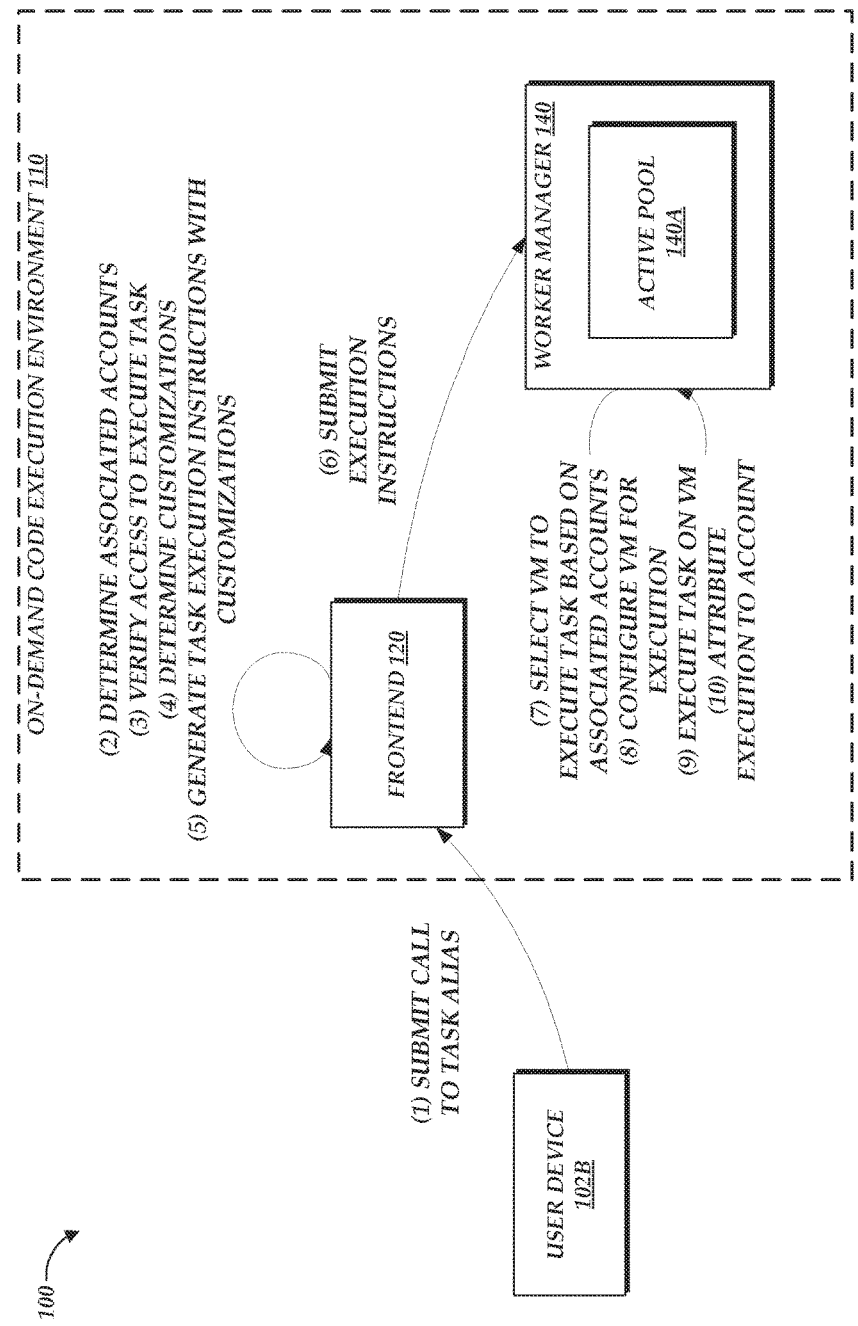
FIG. 4 is a flow diagram depicting illustrative interactions for submission of a call to execute a cross-account task to the on-demand code execution environment of FIG. 1, and processing of that call by the on-demand code execution environment.

With reference to FIG. 4, illustrative interactions are depicted for cross-account execution of a task (e.g., execution of a task owned by a first account on behalf of a second account) on the on-demand code execution environment 110. As noted above with respect to FIG. 3, cross-account execution can be facilitated by the use of aliases, which can be associated with a given account, but which reference a task on a different account (and potentially customize how that referenced task is executed). For the purposes of description, the interactions of FIG. 4 will be described with reference to the same task alias described with reference to FIG. 3 (e.g., a task alias associated with an account of user device 102B, referencing a task owned by a different account of user device 102A, not shown in FIG. 4). Accordingly, the interactions of FIG. 4 begin at (1), where the user device 102B submits a call to the task alias to the frontend 120. As noted above, submission of a call may include transmission of specialized data to the frontend 120, such as a HTTP packet or API call referencing the task alias. While the interactions of FIG. 4 are described as including an explicit call to the task alias by the user device 102B, calls to the task alias may occur in the same variety of manners as a call to a task itself, including submission of a call by auxiliary services 106 (not shown in FIG. 4) or generation of a call by the on-demand code execution environment 110 (e.g., based on a rule to call the alias when specific criteria are met, such as elapsing of a period of time or detection of data on an auxiliary service 106). The call may include any information required to execute the task, such as parameters for execution, authentication information under which to execute the task or to be used during execution of the task, etc.

Thereafter, at (2), the frontend 120 determines accounts associated with the call. Illustratively, a "calling" account (e.g., an account requesting execution of the called task) may be determined based on a source of the call (e.g., a source address), information within the call, or both. For example, the user device 102B may include, within the call, authentication information for the account associated with user device 102B. An "owning" account (e.g., an account that initially created or otherwise owns the task) may be determined by reference to a data store, such as account data store 164 of FIG. 1 (not shown in FIG. 4). As described below, the accounts associated with a call may affect the permissions under which the task executes, as well as the account to which the execution is attributed (e.g., for purposes of monitoring consumption of computing resources, etc.).

In addition, at (3), the frontend 120 verifies that the call is permitted to execute the task via the task alias. Such verification may include, for example, verifying that appropriate credentials are included within the alias call, verifying that use of the alias complies with permissions of the task referenced by the alias (e.g., that the user device 102B is permitted to call the task via an alias), or verifying other attributes of the user device 102B or an associated account (e.g., that the account is in good standing on the on-demand code execution environment). While not shown in FIG. 4, interaction (3) (along with the other interactions of the frontend 120) may include communications with the account manager 160 of the on-demand code execution environment, such as the retrieval of information regarding an alias, a task referenced by the alias, account data of an account associated with the alias or the reference task, etc.

At (4), the frontend 120 determines any customizations associated with the alias to be made to the task referenced by the alias. For example, the frontend 120 can determine any modifications specified by the user device 102B to be made when executing the referenced task, such as parameter additions, modifications, or overrides, changes in execution environment, changes in execution permissions or available resources, etc. As described above with reference to FIG. 3, these customizations can in some instances be specified by the user device 102B when creating the alias. Interaction (4) may thus involve retrieving such customizations from a data store (e.g., the account data store 164, not shown in FIG. 4). Additionally or alternatively, customizations may be specified by the user device 102B within the call to the alias itself.

At (5), the frontend 120 generates execution instructions for the task referenced by the alias, as potentially altered based on the customizations associated with the alias. These execution instructions may include any information needed by the worker manager 140 to execute the task successfully, including (but not limited to) a reference to the task, parameters for the task, permissions needed by the task, authentication information to be used during execution of the task or passed to the task (e.g., as submitted in the task call or associated with customizations of the task), resources to be provided to a virtual machine instance executing the task, identification of accounts associated with execution of the task (e.g., the account associated with the task alias, the account associated with the task referenced in the alias, etc.), or identification of an account to which execution of the task should be attributed. While not shown in FIG. 4, the frontend 120 may in some instances implement additional functionality prior to submitting execution instructions for the task, such as queuing of the task execution instructions to prevent overuse of computing resources.

At (6), the frontend 120 submits the execution instructions to the worker manager 140. The worker manager 140, in turn, selects a virtual machine instance within the active pool 140A on which to execute the task. Selection of a virtual machine instance may include a variety of criteria, such as whether a virtual machine instance is available within the active pool 140A that satisfies requirements or preferences for executing the task (e.g., required permissions, resource access, dependencies, execution environment, etc.). In the instance that such a machine is not available within the active pool 140A, the worker manager 140 may interact with the warming pool manager 130 (not shown in FIG. 4) to add such a virtual machine instance to the active pool 140A, as described within the '556 Patent. In the instance that multiple virtual machine instances are available within the active pool 140 that satisfy requirements or preferences for executing the task, the worker manager 140 may select between the virtual machines based on a number of criteria, including but not limited to load balancing of the virtual machine instances.

In some instances, the on-demand code execution environment 110 can impose limitations on what virtual machine instances may execute the task. Illustratively, the worker manager 140 may in most instances be required to place tasks owned by a given account, and executing in the context of that account, within a virtual machine instance that is associated with that account (and that does not execute tasks associated with other accounts). In this manner, the security and privacy of the task and the data managed by the task can be increased. However, in implementing cross-account execution of a task, the worker manager 140 can be provided with more flexibility in the use of virtual machine instances. For example, because cross-account execution of a task can in some instances implicate access to data of both an owning account (e.g., the account owning the referenced task) and a calling account (e.g., the account associated with a call to executed the referenced task), the worker manager 140 may be configured to allow execution of the task on virtual machine instances either associated with the owning account or the calling account. This increased flexibility in selecting virtual machine instances may increase the efficiency of the worker manager 140 in use of underlying computing resources (e.g., by grouping more task executions onto a single underlying hardware device). In other instances, implementing cross-account execution of a task may reduce the flexibility of the worker manager 140 in selecting a virtual machine instance to execute a task, in order to increase security during execution of the task. For example, where cross-account execution of a task is requested, the work manager 140 may select (or create) a virtual machine instance associated with both the owning account of the task and the calling account, such that only cross-account tasks associated with both the owning and calling account may be executed on the instance. While this configuration may increase security, it may also be associated with increased resource use of underlying hardware (e.g., due to the overhead required to maintain a separate virtual machine instance associated with both accounts). In one embodiment, the worker manager 140 is configured (e.g., by an administrator of on-demand code execution environment 110) to select virtual machine instances according to static rules (e.g., to select instances associated with an owning account, a calling account, either an owning or calling account, both an owning or calling account, etc.). In another embodiment, users associated with a task alias or a task referenced by an alias may specify how virtual machine instances are selected to execute tasks. For example, either or both of an owning account or a calling account may specify that execution of that task via an alias may or must occur on a virtual machine associated with the owning account, may or must occur on a virtual machine associated with a calling account, is preferred to occur on specified types of virtual machine instances, etc.

After selection of a virtual machine instance on which to execute the task, the worker manager 140 can, at (8), configure the virtual machine instance, if required, in order to execute the task according to the execution instructions (e.g., including customizations specified by the user device 102B). For example, the worker manager 140 may create a container on the virtual machine instance in which to execute the task, grant the virtual machine instance (or container) permissions or access to resources needed to execute the task, and provision the virtual machine instance (or container) with the code underlying the task, data forming dependencies of that code, etc. Thereafter, at (9), the worker manager 140 can instruct the virtual machine instance to execute the task. Illustratively, instructing the virtual machine to execute the task may include passing parameters of the task to the virtual machine, such as those specified by the task itself, within the task call, or via customizations to the task. For example, parameters may include authentication information (e.g., in the form of authentication tokens, passwords, etc.) for use while executing the task, which may establish permissions for various resources (e.g., network-accessible resources, such as databases, services, etc.) that can be used during execution of the task. Because such parameters can be established by the account owning the task, the account calling the task, or both, tasks executing on a virtual machine can be similarly be granted access to network resources of the owning account, calling account, or both. While not shown in FIG. 4, the worker manager 140 may interact with other components of the on-demand code execution environment 110 in order to return to the user device 102B data regarding execution of the task, such as an indication of whether the task executed successfully, and data returned by executing the task, etc. In addition, the worker manager 140 can take any actions necessary to maintain the active pool 140A, such as deallocating a container or virtual machine that executed the task, as described in more detail in the '556 Patent.

In addition, at (10), the worker manager 140 may record aspects of the execution, in order to attribute the execution to an appropriate account on the on-demand code execution environment. For example, the worker manager 140 may record the amount of time taken to execute the task, computing resources used to execute the task (e.g., CPU cycles, memory, network bandwidth, etc.), or other attributes of the task's execution, in order to facilitate operation of the on-demand code execution environment (e.g., resource management, quota controls, billing, etc.). In one embodiment, the account to which execution should be attributed is the calling account (e.g., an account under which the execution is invoked). In another embodiment, the account to which execution should be attributed is the owning account, or a combination of the calling account and owning account (e.g., such that execution is attributed to both the owning and calling account, or divided among the owning and calling account). The account to which execution should be attributed may be designated, for example, by the on-demand code execution environment 110, in the permissions of a task set by an owning account, in customizations of a task set by a calling account, or any combination thereof.

One of skill in the art will appreciate that the interactions of FIG. 4 may include additional or alternative interactions to those described above. For example, while FIG. 4 is described with reference to a pre-existing alias, the interactions of FIG. 4 may in some instances be modified such that the on-demand code execution environment 110 can process "on-the-fly" requests for cross-account task execution. For example, the frontend 120 may be configured to obtain requests from user devices to execute a task associated with a different account, even when an alias to that task has not yet been created. The frontend 120 may handle the request by first creating an alias for the task (e.g., assuming that permissions to do so are verified), and thereafter processing the request to execute the task via the newly created alias. In some instances, the created alias may be temporary, such that it is not stored (or is deleted) after the single call to execute the referenced task. In this manner, users can be enabled to invoke cross-account execution of tasks even without pre-established aliases.

Figure 5:
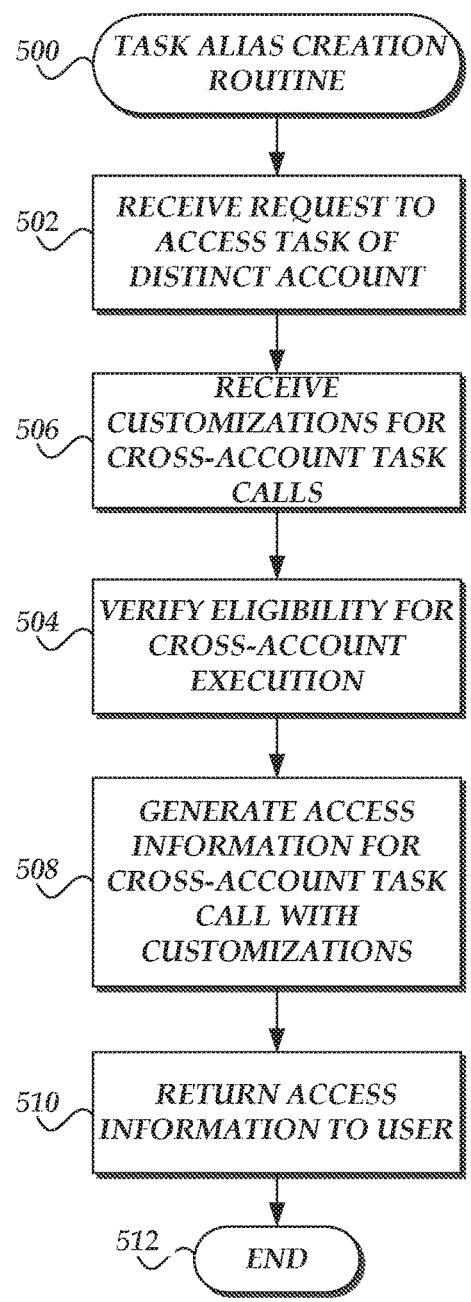
FIG. 5 is a flow chart depicting an illustrative routine for generating access information enabling a first account to call for execution of a task associated with a second account.

With reference to FIG. 5, a block diagram depicting an illustrative routine 500 for generation of an alias that allows cross-account execution of a task on an on-demand code execution environment 110 will be described. The routine 500 begins at block 502, where the on-demand code execution environment 110 (e.g., via a frontend 120) receives a request to create a task alias, referencing a task associated with a distinct account on the on-demand code execution environment 110. Illustratively, the request may be submitted by a user via a GUI provided by the on-demand code execution environment 110, or programmatically (e.g., via an API provided by the on-demand code execution environment 110). The request may specify, for example, the task desired to be referenced by the alias, as well as an account with which to associate the alias.

At block 504, the on-demand code execution environment 110 receives (e.g., via a GUI, API, etc.) customizations to be applied to the execution of the task, when executed via the alias. As noted above, customizations may alter various aspects of how the task is executed at the on-demand code execution environment, such as such as parameter additions, modifications, or overrides, changes in execution environment, changes in execution permissions or available resources, etc. In some instances, the on-demand code execution environment 110 may enable a user to specify only customizations that are permitted with respect to the task to be referenced by the alias (e.g., customizations that comply with permissions applied to the task via the task's owner). In other instances, the on-demand code execution environment 110 may enable a user to specify any customizations to the task, and return errors for any non-permitted customizations.

At block 506, the on-demand code execution environment 110 verifies that the account associated with the request is eligible to cause cross-account execution of the task. As noted above, an owner of a task may specify restrictions or eligibility criteria that limit cross-account execution of a task. For example, the owner may specify that only specific accounts or specific types of accounts (e.g., accounts associated with particular licenses) may cause cross-account execution of a task. In the instance that an account associated with the request is not eligible to cause cross-account execution of the task, the routine 500 may end. In addition, block 504 may include verification that any customizations requested comply with permissions of the task. Where requested customizations are not permitted, the on-demand code execution environment 110 may require the user to correct those customizations before the routine 500 proceeds.

Assuming that the account associated with the request is eligible to cause cross-account execution of the task, the routine 500 continues to block 508, where an alias enabling cross-account execution of the task is generated at the on-demand code execution environment 110. Illustratively, the alias may be associated with an account of the user, and serve as a logical "object" within a namespace associated with the user account, such that referencing that logical object causes cross-account execution of the task. In this manner, the alias can serve as a "shortcut" or "pointer" to the task, and may be called in a manner similar to that task. However, because the alias is associated with a different account than the task, and potentially with customizations, the alias can enable a user of that different account to quickly invoke the task, subject to any requested customizations.

Thereafter, at block 510, the on-demand code execution environment 110 can return access information for the alias to the requesting user. Illustratively, the access information may include an endpoint, such as a URL, to which calls to the alias can be directed. Accordingly, by submitting a call according to the access information, the requesting user can cause execution of the task, owned by another account, in the context of their own account and with their requested customizations applied. The routine 500 can then end at block 512.

Figure 6:
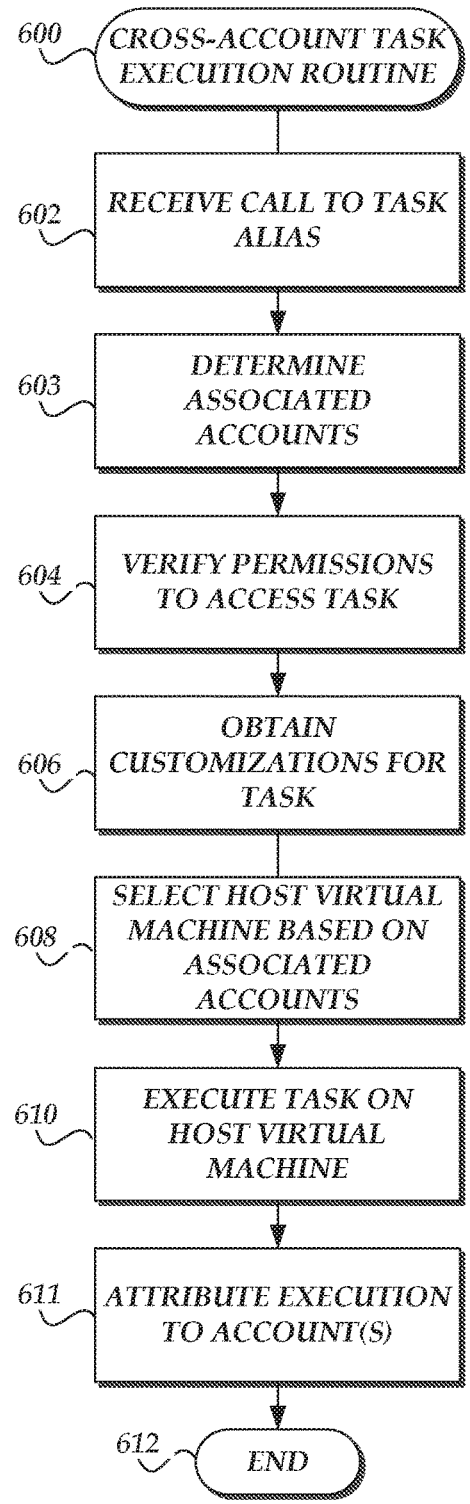
FIG. 6 is a flow chart depicting an illustrative routine for generating access information enabling a first account to call for execution of a task associated with a second account.

With reference to FIG. 6, a block diagram depicting an illustrative routine 600 for cross-account execution of a task utilizing an alias will be described. The routine 600 begins at block 602, where the on-demand code execution environment 110 (e.g., via a frontend 120) receives a call to an alias on a first account referencing a task of a second account (e.g., as may be created via the routine 500 of FIG. 5, described above). Illustratively, a call to the alias may occur in the same or substantially similar manner that a call to a task itself may occur, such as by transmission of an HTTP packet to the on-demand code execution environment 110, transmission of an API call, etc.

At block 603, the on-demand code execution environment 110 determines accounts associated with the call. As noted above, the on-demand code execution environment 110 may determine a "calling" account (e.g., an account requesting execution of the called task) based on a source of the call (e.g., a source address), information within the call, or both. The on-demand code execution environment 110 may determine an "owning" account (e.g., an account that initially created or otherwise owns the task) may be determined by reference to a data store, such as account data store 164 of FIG. 1 (not shown in FIG. 4). The accounts associated with a call may affect the permissions under which the task executes, as well as the account to which the execution is attributed (e.g., for purposes of monitoring consumption of computing resources, etc.).

At block 604, the on-demand code execution environment 110 verifies that the call to the alias satisfies permissions associated with the task referenced by that alias. For example, the owner of the reference task may specify that only specific accounts or types of accounts may utilize an alias to call a task, or may place other restrictions on those calls (e.g., that calls can only occur at specific times of day, at a specified frequency, etc.). Accordingly, the on-demand code execution environment 110, prior to executing the task, can verify that the received call complies with those permissions.

If the call is verified to comply with the permissions of the task, the routine 600 continues to block 606, where the on-demand code execution environment 110 determines customizations (if any) for execution of the task via the alias. Illustratively, these customizations may be pre-established and associated with the alias (e.g., at the time at which the alias is created), specified within the call to the alias, or a combination thereof. The customizations may modify any aspect of how the task is executed by the on-demand code execution environment 110, subject to the permissions for such customizations by the on-demand code execution environment 110 and/or an owner of the task. For example, the customizations may alter parameters to pass to code corresponding to the task, the execution environment required to execute the task, the permissions or resources available to the task during execution, etc.

At block 608, the on-demand code execution environment 110 selects a virtual machine instance on which to execute the task. Selection of a virtual machine instance may include a variety of criteria, such as whether a virtual machine instance is available within a pool of active virtual machine instances that satisfies requirements or preferences for executing the task (e.g., required permissions, resource access, dependencies, execution environment, etc.), load balancing of the virtual machine instances, or other criteria. In some instances, the on-demand code execution environment 110 may be configured to allow execution of the task on virtual machine instances either associated with the owning account or the calling account, thereby increasing flexibility in selecting virtual machine instances and consequently increasing the efficiency of the worker manager 140 in use of underlying computing resources. In other instances, the on-demand code execution environment 110 may select (or create) a virtual machine instance associated with both the owning account of the task and the calling account, such that only cross-account tasks associated with both the owning and calling account may be executed on the instance, thereby increasing security in executing the task.

At block 610, the on-demand code execution environment 110 causes the selected virtual machine instance to execute the task according to any customizations associated with the called alias. In some instance, such execution may require that the virtual machine instance be configured or modified prior to executing the task, such as by creating a container on the virtual machine instance in which to execute the task, granting the virtual machine instance (or container) permissions or access to resources needed to execute the task, or provisioning the virtual machine instance (or container) with the code underlying the task, data forming dependencies of that code, etc. Thereafter, the virtual machine instance can execute the task on behalf of the account associated with the alias. Thus, users of the on-demand code execution environment 110 are enabled to call and execute tasks of other accounts, while maintaining the privacy and security of the code underlying that task.

At block 611, the on-demand code execution environment 110 can attribute the execution to an appropriate account. Illustratively, attributing execution to an account can include reporting aspects of the execution, such as execution time or computing resources used during execution, as associated with that account. In one embodiment, the account to which execution should be attributed is the calling account (e.g., an account under which the execution is invoked). In another embodiment, the account to which execution should be attributed is the owning account, or a combination of the calling account and owning account (e.g., such that execution is attributed to both the owning and calling account, or divided among the owning and calling account). The account to which execution should be attributed may be designated, for example, by the on-demand code execution environment 110, in the permissions of a task set by an owning account, in customizations of a task set by a calling account, or any combination thereof. Thereafter, the routine 600 can end at block 612.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to enable use of tasks on an on-demand code execution environment as application programming interfaces, the system comprising:
   a non-transitory data store configured to store tasks, wherein individual tasks are owned by accounts of the on-demand code execution environment and are associated with code executable to implement functionality corresponding to the individual tasks; and
   one or more processors configured with computer-executable instructions to:
      receive a request from a user computing device associated with a first account to designate a set of tasks owned by the first account on the on-demand code execution environment as an application programming interface ("API") for a network-accessible service;
      receive a request from a second user computing device associated with a second account to access the API;
      enable the second user computing device to call the set of tasks owned by the first account on the on-demand code execution environment;
      receive an API call from the second user computing device corresponding to at least one task of the set of tasks;
      select a virtual machine instance within the on-demand code execution environment on which to execute code corresponding to the at least one task, wherein the virtual machine instance is dedicated to at least one of execution of tasks of the first account or execution of tasks of the second account;
      execute within the virtual machine instance the code corresponding to the at least one task on behalf of the second account;
      monitor computing resources associated with the execution of the code; and
      attribute computing resources associated with the execution of the code to the second account.

2. The system of claim 1, wherein the one or more processors are further configured with the computer-executable instructions to obtain permissions-associated with the API by a user of the first account, and to verify that the second account complies with the permissions.

3. The system of claim 2, wherein the permissions indicate at least one of individual accounts permitted to generate aliases to the task or types of accounts that are permitted to generate aliases to the task.

4. The system of claim 1, wherein the one or more processors are configured with the computer-executable instructions to enable the second user computing device to call the set of tasks owned by the first account on the on-demand code execution environment at least partly by generating an alias associated with the first account and referencing at least one of the set of tasks.

5. The system of claim 4, wherein generating the alias associated with the first account and referencing at least one of the set of tasks comprises at least one of generating a distinct alias for each task of the set of tasks or generating an alias referencing the set of tasks collectively.

6. A computer-implemented method to enable to enable use of tasks on an on-demand code execution environment as application programming interfaces, the computer-implemented method comprising:
   receiving, from a first computing device associated with a first account on the on-demand code execution environment, executable code corresponding to a set of tasks, wherein execution of the executable code corresponding to an individual task implements functionality associated with a network-accessible service;
   receiving, from the first computing device, a request to designate the set of tasks as an application programming interface ("API") for the network-accessible service; receiving from a second computing device associated with a second account an API call corresponding to a task of the set of tasks;
   selecting a virtual machine instance within the on-demand code execution environment on which to execute code corresponding to the task, wherein the virtual machine instance is associated with at least one of execution of tasks of the first account or execution of tasks of the second account;
   executing within the virtual machine instance the executable code corresponding to the task on behalf of the second account;
   monitoring computing resources associated with the execution of the code; and
   attributing computing resources associated with the execution of the code to the second account.

7. The computer-implemented method of claim 6 further comprising receiving a request from the second user computing device to access the API, wherein the request comprises one or more customizations to be made when executing at least one task of the set of tasks on behalf of the second account.

8. The computer-implemented method of claim 7 further comprising modifying the virtual machine instance according to the customizations prior to execution of the code.

9. The computer-implemented method of claim 7 further comprising receiving, from the user computing device, authentication information associated with a network resource of the second account, wherein executing within the virtual machine instance the code corresponding to the task on behalf of the second account comprising passing the authentication information to the virtual machine.

10. The computer-implemented method of claim 6, wherein the request to designate the set of tasks as the API for the network-accessible service further comprises selection criteria to be applied when selecting the virtual machine instance, and wherein selecting the virtual machine instance includes selecting the virtual machine instance according to the selection criteria.

11. The computer-implemented method of claim 6 further comprising generating an alias associated with the second account and referencing at least one of the set of tasks.

12. The computer-implemented method of claim 6 further comprising: receiving, from the first computing device, modified executable code for the task; applying the modified executable code to the task to result in a modified task; and verifying that the alias complies with the modified task.

13. Non-transitory computer-readable storage media including computer-executable instructions that, when executed by a computing system, cause the computing system to:
   receive, from a first user computing device associated with a first account on an on-demand code execution environment, executable code corresponding to a set of tasks, wherein execution of the executable code corresponding to an individual task implements functionality associated with a network-accessible service;

receive, from the first user computing device, a request to designate the set of tasks as an application programming interface ("API") for the network-accessible service;

receive, from a second user computing device associated with a second account on the on-demand code execution environment, an API call corresponding to a task of the set of tasks;

select a virtual machine instance within the on-demand code execution environment on which to execute code corresponding to the task, wherein the virtual machine instance is associated with at least one of execution of tasks of the first account or execution of tasks of the second account;

execute within the virtual machine instance the executable code corresponding to the task on behalf of the second account;

monitor computing resources associated with the execution of the code; and attribute computing resources associated with the execution of the code to the second account.

14. The non-transitory storage media of claim 13, wherein the API call further includes one or more customizations to be made when executing the task on the on-demand code execution environment, and wherein the computer-executable instructions cause the computing system to execute the code at least in part by applying the one or more customizations.

15. The non-transitory storage media of claim 14, wherein the customizations include at least one of a modification to or addition of a parameter to be passed to the code corresponding to the task when executed on behalf of the second account, a modification of permissions to be given to the virtual machine instance when executing the code, a modification of the execution environment to be used within the virtual machine instance, or a modification of the resources to be provided to the virtual machine instance when executing the code.

16. The non-transitory storage media of claim 13, wherein the computer-executable instructions cause the computing system to generate an alias associated with the second account and referencing at least one task of the set of tasks.

17. The non-transitory storage media of claim 16, wherein the computer-executable instructions cause the computing system to:
receive, from the first user computing device, modified executable code for the task;
apply the modified executable code to the task to result in a modified task; and
verify that the alias complies with the modified task.

18. The non-transitory storage media of claim 13, wherein the computer-executable instructions cause the computing system to obtain selection criteria provided by a user of the first account to be applied when selecting the virtual machine instance, and to select the virtual machine instance according to the selection criteria.

19. The non-transitory storage media of claim 13, wherein the computer-executable instructions cause the computing system to obtain permissions associated with the API by a user of the first account, and to verify that the first account complies with the permissions.

20. non-transitory storage media of claim 19, wherein the permissions specify a license that must be associated with the second account prior to execution of the task on behalf of the second account.

21. The non-transitory storage media of claim 13, wherein the second computing device associated with the second account is a virtual machine instance within the on-demand code execution environment.

* * * * *

UNITED STATES PATENT AND TRADEMARK OFFICE
CERTIFICATE OF CORRECTION

PATENT NO. : 10,203,990 B2
APPLICATION NO. : 15/199613
DATED : February 12, 2019
INVENTOR(S) : Wagner et al.

Page 1 of 1

It is certified that error appears in the above-identified patent and that said Letters Patent is hereby corrected as shown below:

In the Claims

In Column 31, Line 43, Claim 2, change "permissions-associated" to --permissions associated--.

In Column 31, Line 62, Claim 6, change "to enable to enable" to --to enable--.

In Column 34, Line 27, Claim 20, change "non-transitory" to --The non-transitory--.

Signed and Sealed this
Twenty-fifth Day of June, 2019

Andrei Iancu
*Director of the United States Patent and Trademark Office*